Patented June 13, 1950

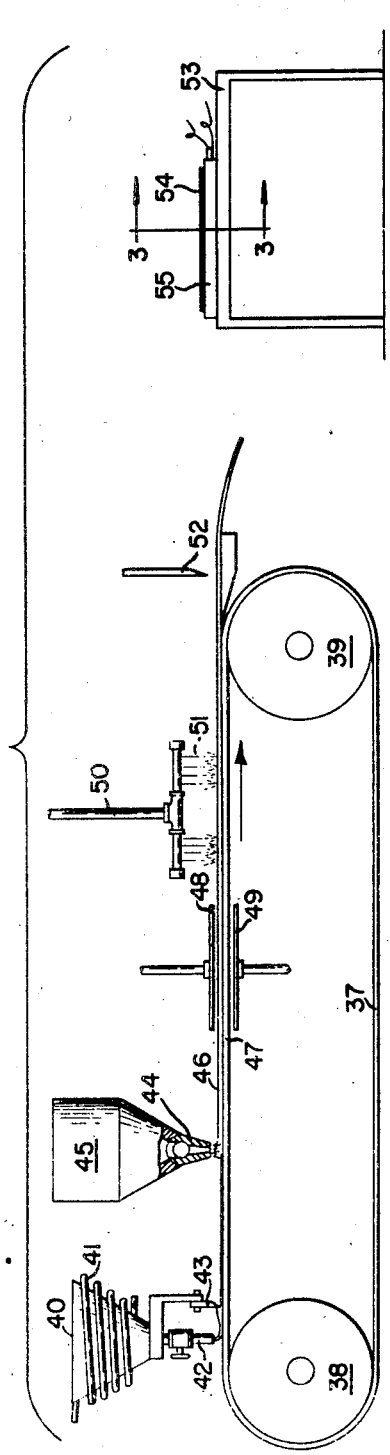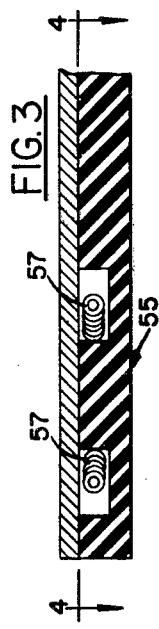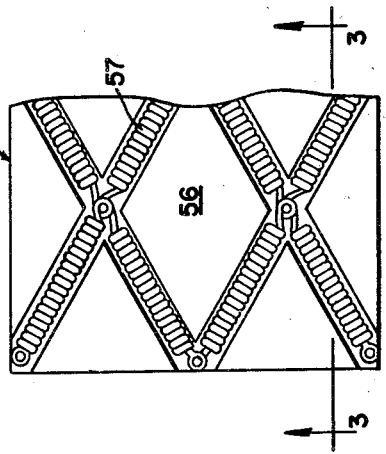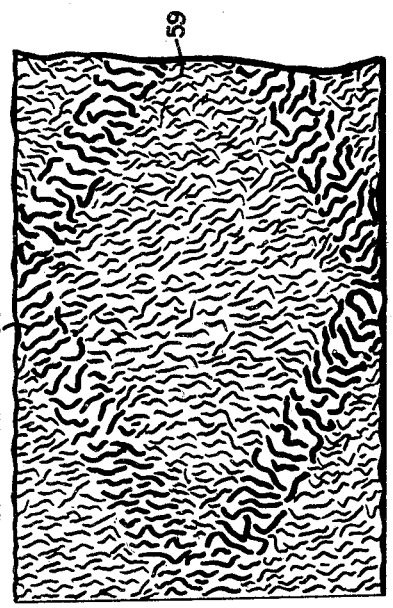

2,510,966

UNITED STATES PATENT OFFICE 2,510,966

METHOD OF GIVING NONWRINKLING MATERIALS A WRINKLE TEXTURE

William F. Flanagan, Dayton, Ohio, assignor to New Wrinkle, Inc., Dayton, Ohio, a corporation of Delaware Application November 12, 1946, Serial No. 709,310

8 Claims. (Cl. 18—57)

This invention deals with a method of making wrinkle coatings, and in particular with a method of transforming coatings of non-wrinkling compositions into such having a wrinkle texture, and with products obtained thereby.

It is an object of this invention to give a wrinkle texture to a coating which has heretofore been held non-wrinkling.

It is another object of this invention to provide wrinkle coatings that are fast drying.

It is still another object of this invention to provide wrinkle-textured films in an unusually simple and inexpensive manner.

It is still another object of this invention to give a wrinkle texture to a conventional non-wrinkling coating by means of materials which are extremely inexpensive.

It is still another object of this invention to produce a wrinkle-textured finish which has a predetermined pattern within said texture.

These and other objects are broadly accomplished by applying a solution of non-wrinkling resin to a base plate, developing a thin skin on the surface of said resin solution, spraying water onto the skin, and thereafter drying the coating.

It was found that by the simple method of spraying water on the preferably warm coating, a wrinkle texture develops which has an entirely uniform pattern. I do not know the reason for this unexpected and striking result. However, it seems possible and likely that the wrinkle formation is caused by a different rate or reduction in temperature at various locations within the coating, the water causing a more rapid cooling down at the locations where it is applied than does occur at the non-wetted spots. This, however, is merely an assumption for which no proof is available.

All thermoplastic resins were found operative for the process and products of my invention. Thus, for example, vinyl acetate copolymers, vinyl chloride copolymers or a mixture of the two, chlorinated rubbers, styrene polymers and copolymers, cellulose acetate, cellulose acetate butyrate, cellulose acetate propionate, methyl cellulose, vinyl butyrate, polyethylene, butadiene copolymers such as butadiene acrylonitrile and butadiene styrene copolymers, methyl methacrylate, vinylidene copolymer, vinyl alcohol polymers, vinyl acetate polymers, vinyl chloride-vinylidene chloride copolymer and mixtures of these substances are among those which were found satisfactory for the process of my invention.

As the solvents, those were preferred which have a high evaporation rate. For instance, methyl ethyl ketone, acetone, butyl acetate, cyclo-hexanone, xylol, toluol, toluol together with nitro-paraffins, and amyl acetate were found highly satisfactory. The concentration of the resin solution depends upon the viscosity desired. The lower the viscosity, the better the skinning action will be. Generally, a concentration of from 10 to 65 parts by weight of resin per 100 parts by weight of solution was the range found satisfactory. The viscosity preferred was approximately 36.2 centipoises at 25° C. However, this viscosity is by no means obligatory, especially not since the way of applying the coating composition also necessitates an adjustment of the concentration of the solution as will be set forth in a later paragraph.

While a resin solution consisting merely of resin and solvent is fully satisfactory, it is often advantageous and therefore desirable to add a plasticizer. All plasticizers known in the art are suitable for this purpose. Tricresyl phosphate, dioctyl phthalate and dibutyl phthalate are examples for suitable plasticizers.

Other auxiliary ingredients may be added to the resin solution without deviating from the concept of the invention. Thus, filler materials, pigments and dyes may be incorporated into the coating solution.

The coating composition may be applied by any means known in the art. Knifing, rolling and spraying have been used with satisfaction. It will be obvious that for spraying, the use of a less viscous solution is advisable than is preferred for knifing or rolling.

A thin skin is then developed on the surface of said coating. This may be done by merely allowing the coating partly to dry at room temperature or else by flash heating, the latter being the preferred method. The flash heating step may be carried out, for example, with infrared heat, with a hot blast, or in an oven having the temperature necessary. The heating time as well as the temperature depend upon the composition applied, in particular on the boiling point and evaporation rate of the solvent, and also to a certain degree upon the heat sensibility of the base material on which the coating has been applied. In general, heating from 35° C. for four minutes up to 135° C. for approximately 30 seconds was found to give satisfactory results.

The film, after a thin surface skin has formed, is then exposed to a water spray. For this, plain tap water suffices; however, water to which a small amount of wetting agent has been added gives better results and in particular a more uniform texture. The addition of up to 3% wetting agent was found the preferred quantity. All wetting agents known are operative for the process of the invention. It is desirable that the spraying step is carried out without great delay after formation of the skin has set in.

The water sprayed onto the coating does not evaporate immediately from the surface of the film, but it is being absorbed rapidly by the coating. This is another phenomenon which was not to be expected and for which there is no explanation available as yet. Wrinkling formation sets in immediately and increases as the film cools down. Drying of the water-sprayed and wrinkled film may be either carried out by forced means such as oven drying, or by letting the film air-dry until the solvent has evaporated. A combination of heating and air-drying was found especially satisfactory. In this case, heating for a fraction of a minute suffices in order to initiate the drying procedure.

The film produced by the process of my invention may be used as such or in combination with a base on which it has been applied. If the film is to be employed alone, it has to be removed from the base plate on which it has been prepared. In such case, the use of smooth rigid plates, as for example metal bands, glass plates, hard rubber plates or the like, is advisable. In order to facilitate removing of the film from the base, it is recommended to apply a thin coat of lubricant thereto prior to coating with the resin solution. Another very satisfactory method, instead of lubricating the plate, is that of dipping the base with the finished film into a solution of trisodium phosphate for a short period of time. After such a pretreatment, the film may be easily removed by a scraper or other means known to the art.

The new wrinkle coating may, however, be applied to a proper base with the intention to obtain a combination material. Thus, paper, glass, cloth material, metal articles and many others may be permanently provided with a film produced by the method of the invention.

According to another embodiment of the invention, the steps of applying and flash drying the film prior to water spraying may be combined into one single step by using a heated doctor blade for spreading the film on the base plate.

In addition to the production of a uniform wrinkle pattern, additional effects may be obtained in the surface appearance of the coating of my invention. Thus, for example, metal powder may be applied to the base plate prior to coating it with the resinous material. This gives a particularly pleasing metallic luster to the product obtained, no matter whether it is to be used on the base plate or as a film by itself. The metal powder, in the case that the film is peeled off, sticks to the surface of the resin coating so that the metallic appearance will be retained in the film after its removal from the base.

Another way of modifying the appearance is by giving it a pattern of different colors. This may be done by choosing a dye of selective solubility. Thus, for example, a dye may be used which is soluble in water but not in the solvent used for the resin. In this case, it will only enter the water droplets and thus appear only in spots in the film. On the other hand, a dye may be used which is water insoluble but soluble in the resin solvent; a similar multi-colored effect will be attained in this case.

I also found that a pattern may be obtained within the wrinkle texture by causing the development of wrinkles of different sizes. The application of different degrees of heat in different spots of the film proved to yield wrinkles of dissimilar size. For example, I heated the film on a plate which was heated by electrical heating coils. These coils were arranged in a diamond-shaped relationship. When I removed the film heated on this plate, the pattern in which the resistance was arranged in said heating plate was reproduced in the film, the film showing coarse wrinkles along the lines corresponding to the wires of resistance and finer wrinkles therebetween. While this patternheating, as I call it, may be done before or after spraying with water, I obtained better results when heated prior to the application of water. This is a new way of producing patterns in wrinkle finishes, and by modifying the arrangement of the resistance in the heating device, a great variety of patterns may be produced in the most simple manner.

By combining the various modifying procedures described in the foregoing, further new effects may be obtained. Thus, unpredictable possibilities are available for the production of variegated wrinkle patterns from non-wrinkling coating materials.

The uses of the coatings of my invention are manifold. The materials are suitable for curtains, rain coats, oil cloth, either alone or as applied to an appropriate base material, they are usable for protecting metal parts against rust or other surface-corrosive effects, they may be applied to paper, glass or the like and then be used, for example, as the material for lamp shades, they may be used as leather imitation materials and for many other purposes.

In the following, an example is given which demonstrates the production of one kind of film made by the method of my invention.

Example 100 grams vinyl acetate-vinyl chloride copolymer
4 grams dioctyl phthalate
200 grams butyl acetate
43 grams methyl ethyl ketone
14 grams cyclohexanone The resin copolymer used was formed of 87 molal percent of vinyl chloride and 13 molal percent of vinyl acetate. It was dissolved in the solvents, and the plasticizer, dioctyl phthalate, was then added. After the mixture had completely dissolved, an additional quantity of solvent was added until a viscosity of 36.2 centipoises at 25° C. was obtained. The solution was then flowed by gravity onto a glass plate and passed under a doctor blade which was adjusted so as to yield a film of between 20 and 25 mils. The glass plate with the film was then heated to 65° C. for 3 minutes when a thin skin had formed on the surface thereof and immediately sprayed with water which contained 1.5% of a wetting agent of a group of higher sodium alkyl sulfates. The glass plate with the film was then allowed to cool down for approximately 15 minutes. During this time the wrinkle formation set in, and the water completely disappeared from the surface. Thereafter the film was oven dried for a very short time in order completely to remove the solvent therefrom. Finally the glass plate was immersed into a 10% solution of trisodium phosphate whereupon the film could be easily stripped off the plate.

I wish to mention that forced drying, after water spraying, is not necessary and that the same result may be obtained by merely letting the coated articles air-dry. Due to this fact, the process of my invention may be carried out in an extremely simple and inexpensive manner and without requiring any skilled labor.

In the accompanying drawings, a few embodiments of my invention are illustrated by way of example. These illustrations are not intended to be of limiting character. In these drawings, Figure 1 is a diagrammatic elevational view of an apparatus for carrying out the various steps of the process of my invention;

Figure 2 is a similar diagrammatic elevational view of a modification of the process of my invention;

Figure 3 is an enlarged fragmentary longitudinal section through the heating plate of Figure 2 along the line 3—3;

Figure 4 is a fragmentary cross sectional plan view of the heating plate taken along line 4—4 of Figure 3; and Figure 5 is an enlarged fragmentary view of a film obtained with the heating plate illustrated in Figure 4.

Figure 1:
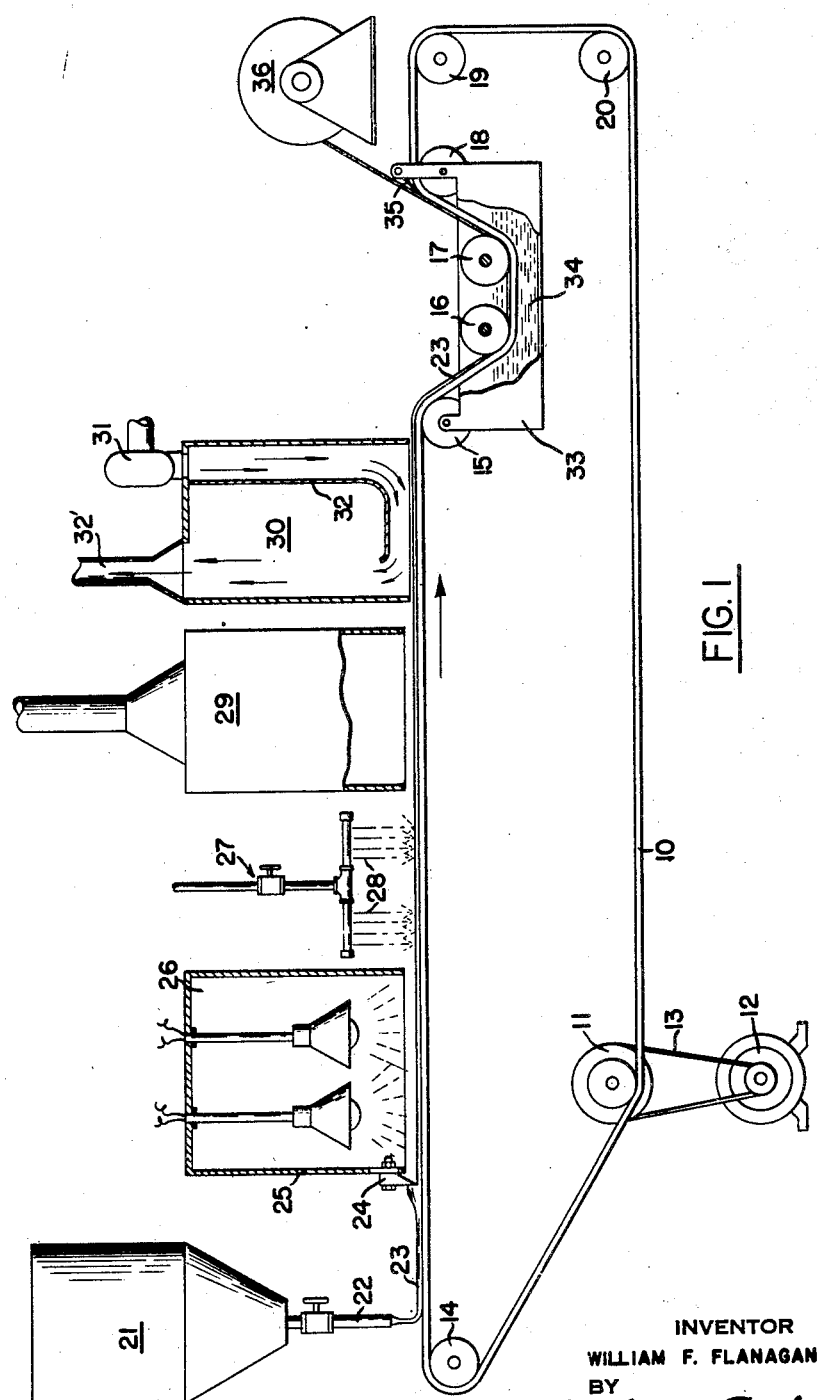

Referring to the drawings in detail, and particularly to Figure 1, the reference numeral 10 illustrates an endless metal band guided over a driving roller 11 which is driven by a motor 12 via a belt 13. The belt 10 is also guided over a number of guide rolls 14, 15, 16, 17, 18, 19 and 20. Over the metal belt 10 there is arranged a reservoir 21 which holds a resin solution composed of a non-wrinkling resin dissolved in a proper solvent. A pipe 22 forms the outlet for dispensing said resin solution onto the metal band in the form of a film 23. A doctor blade 24 is adjustably supported on a rack 25 close to said reservoir 21. This blade may be adjusted according to the thickness desired of the film. Next to said doctor blade, there is arranged a drying oven 26. The reference numeral 27 indicates a spraying device with which a water spray 28 is applied to the film 23. Next to the water spray 27 there is arranged another drying oven 29, and following it there is mounted a chamber 30. A pipe 32 which is connected with a pump 31 leads into said chamber 30. An outlet 32¹ is also arranged at the chamber 30 for the solvent driven off from the film; this outlet may be connected with a solvent recovery system (not shown). A bath 33 containing a solution of trisodium phosphate 34 is arranged next to the blasting chamber; the guide rolls 15, 16, 17 and 18 are attached to this bath. Next to the outlet end of the bath 33 there is arranged a scraper 35. The reference numeral 36 indicates a winding reel for the film 23.

The device illustrated in Figure 1 operates as follows: The metal band 10 is continuously driven in the direction of the arrow. A resin solution is dispensed from the reservoir 21 through the pipe 22 onto the metal band 10; the doctor blade 24 then spreads the resin composition so as to form a film of uniform and predetermined thickness. Thereafter the film is flash heated in the oven 26 for a period of time just sufficient to develop a thin surface skin. The metal band then carries the film under the water sprayer 27 where it is thinly covered with a layer of finely dispersed water droplets. In the instance illustrated, the film is then brought into the oven 29 where it is subjected to brief drying. There the wrinkle texture starts to develop, and the water is absorbed by the film. Thereafter the film covered metal band arrives at the chamber 30 where it is treated with a warm air blast in order fully to remove the solvent. The metal band, which is now covered with a dry, homogeneous film of a uniform wrinkle texture, then enters the bath 33; the trisodium phosphate contained therein loosens the film from the metal base whereby peeling off of the coating is facilitated. Thereafter the film is removed by the scraper 35. The finished product is then received by and wound onto the reel 36.

In Figure 2 a modification of my process and the apparatus advantageous for carrying out this specific embodiment are illustrated. There, an endless band 37 is guided over rollers 38 and 39 and driven in the direction of the arrow. A dispensing hopper 40 equipped with a heating coil 41 is arranged at the place where the band enters the upper level of the loop. The hopper 40 contains wax material which is held in a molten condition by means of a hot medium circulating in the heating coil 41. A thin layer of wax is applied to the band by means of an outlet 42, and a doctor blade 43, which is arranged next to said reservoir, provides for uniform thickness of said wax layer. The wax coated band then arrives under a sprayer 44 which is connected with a container 45. This container holds a resin solution. A film 46 is produced by spraying this resin solution onto the band 37. Next to the dispenser 45 there is installed a heating device 47 which consists of two high-frequency heating plates 48 and 49. There the film is heated until a thin skin has formed on the surface. Thereafter the film coated band comes under a sprayer 50 from which water 51 is sprayed thereon similarly as is shown in Figure 1. The film material now leaving the endless belt 37 is cut into pieces by a knife 52. In this instance the sheets 53 are individually dried on a plurality of heating tables, one of which only is shown in the drawing of Figure 2; this heating table is indicated with the reference numeral 53. The detached film-covered plates are designated with the reference numberal 54. Each heating table is equipped with a heating plate 55 in which the heat is created by electricity. Figures 3 and 4 show the heating plate 55 on an enlarged scale. This heating plate 55 consists of a plate 56 of insulated material in which metal coils 57 are embedded. From Figure 4 it is apparent how the heating coils 57 are arranged in a diamond-shaped pattern.

In Figure 5 part of the film obtained on the heating plate 55 is illustrated. It will be seen from this figure that two kinds of wrinkles are clearly distinguishable, namely those 58 located along the lines corresponding to the diamond-shaped arrangement of the heating coils and those 59 therebetween, the wrinkles 58 being of greater depth and width than the wrinkles 59.

It will be understood that while there have been described herein certain specific embodiments of the invention, it is not intended thereby to have it limited to or circumscribed by the specific details given in view of the fact that this invention is susceptible to various modifications and changes which come within the spirit of the disclosure and the scope of the appended claims.

I claim:

1. In a method of making wrinkle-textured films, the steps of (a) applying a layer of an organic solution of thermoplastic resin to a base; (b) drying said layer thereby developing a thin skin on the surface of said layer; (c) spraying finely dispersed water droplets containing up to 3% of a wetting agent onto said skin; (d) evaporating the solvent of said resin solution to form a dry film on said base; (e) immersing said base with said film into a 10% aqueous solution of trisodium phosphate; and (f) removing said film from said base.

2. In a method of making wrinkle-textured films, the steps of (a) preparing a resin solution, said resin solution consisting of 100 grams of a copolymer formed of 87 parts of vinyl chloride and 13 parts of vinyl acetate, 4 grams of dioctyl phthalate as a plasticizer and a solvent mixture consisting of 200 grams of butyl acetate, 43 grams of methyl ethyl ketone and 14 grams of cyclohexanone; (b) adding a further quantity of solvent to said solution so as to obtain a viscosity of 36.2 centipoises at 225° C.; (c) flowing said solution onto a glass base; (d) adjusting the thickness of said resin solution on said plate by passing it under a doctor blade; (e) heating the film-coated glass plate to approximately 65° C. for 3 minutes whereby a thin surface skin is formed; (f) spraying said film immediately with finely dispersed droplets of water containing approximately 1.5% of a wetting agent; (g) allowing said glass plate to cool for approximately 15 minutes; (h) removing the solvent from said resin solution by oven drying; (i) immersing said glass plate into a 10% aqueous solution of trisodium phosphate; and (j) stripping off the film formed on said glass plate.

3. In a method of making wrinkle-textured films, the steps of (a) dusting metal powder on a base plate; (b) applying a layer of an organic solution of thermoplastic resin thereover; (c) drying said layer thereby developing a thin skin on the surface of said resin solution layer; (d) spraying finely dispersed droplets of water onto said skin; and (e) evaporating the solvent of said resin solution.

4. In a method of making wrinkle-textured films, the steps of (a) applying a layer of an organic soultion of thermoplastic resin to a base plate; (b) drying said layer thereby developing a thin skin on the surface of said layer of resin solution; (c) spraying finely dispersed droplets of water onto said skin, said water having dissolved coloring matter insoluble in the solvent of said solution; and (d) evaporating said solvent from said resin solution whereby a wrinkle textured colored pattern forms in the surface of said layer.

5. In a method of making wrinkle-textured films, the steps of (a) applying a layer of a solution of a thermoplastic resin to a base; (b) drying said layer thereby developing a skin on the surface of said layer; (c) spraying finely dispersed droplets of water onto said skin; and (d) evaporating the solvent of said resin solution by placing said film-coated base on a heating plate in which the heat is created by wires of resistance, said wires of resistance being arranged in a pattern whereby a design consisting of fine and coarse wrinkles is formed, said design corresponding to said pattern.

6. As a new article of manufacture, sheet material having a layer of metal dust on its surface and thereover a transparent wrinkle-textured film, said film being formed of a thermoplastic resin-containing coating composition of inherently non-wrinkling properties.

7. In a method of making a wrinkle-textured film, the steps (a) of forming a film of a vinyl copolymer of vinyl chloride and vinyl acetate; the step (b) of regulating the viscosity and plasticity of said film; the step (c) of applying finely dispersed droplets of water which contains a wetting agent to at least one surface of said film, and (d) the step of subjecting the thus treated film to heat to cause the film to wrinkle.

8. In a method of making a film of a predetermined texture, the step (a) of forming a vinyl chloride-acetate copolymer film; the step (b) of spraying finely dispersed droplets of water thereon; and the step (c) of heating predetermined areas of said film to cause the film to form itself into a wrinkle finish pattern over the heated areas.

WILLIAM F. FLANAGAN.

REFERENCES CITED

The following references are of record in the file of this patent:

UNITED STATES PATENTS

| Number | Name | Date |
|---|---|---|
| 1,831,323 | Root | Nov. 10, 1931 |
| 1,922,548 | Mattin | Aug. 15, 1933 |
| 2,007,392 | Dreyfus | July 9, 1935 |
| 2,081,723 | Williams | May 25, 1937 |
| 2,283,420 | Drummond et al. | May 19, 1942 |
| 2,291,616 | Fletcher | Aug. 4, 1942 |
| 2,304,632 | Faelten | Dec. 8, 1942 |

FOREIGN PATENTS

| Number | Country | Date |
|---|---|---|
| 2,517 | Great Britain | 1876 |